Patented Apr. 5, 1932

1,852,294

UNITED STATES PATENT OFFICE

HARRY L. FISHER, OF AKRON, OHIO, ASSIGNOR TO THE B. F. GOODRICH COMPANY, OF NEW YORK, N. Y., A CORPORATION OF NEW YORK

RUBBER CONVERSION PRODUCTS AND METHOD OF MAKING SAME

No Drawing.   Application filed December 28, 1926. Serial No. 157,618.

This invention relates to rubber conversion products and has for an object to produce from rubber, materials which shall have both physical and chemical properties clearly distinguishing them from the rubber from which they are made. A further general object is to provide an improved process for the manufacture from rubber of these materials which process shall be adapted for economical, commercial production.

In my Patent No. 1,605,180 of November 2, 1926, methods of preparing rubber isomers are described, which methods comprise the mixing directly into a mass of crude rubber an isomerizing agent for rubber and heating the mix sufficiently to produce an exothermal reaction within the mass. By this means, rubber isomers having a considerable range of heat-plasticity, toughness and brittleness are produced.

The present invention relates to the preparation of rubber conversion products which are similar to the rubber isomers of my earlier application. The present process is, however, carried out with rubber dissolved in a rubber solvent to which a phenol and hydrochloric acid or hydrobromic acid are added, the mixture being heated at an elevated temperature, as on a steam bath and preferably under reflux to prevent loss of solvent, for an extended period of time. Experiment has shown that a rubber solution, when heated with a phenol alone or when heated alone with hydrochloric acid, or hydrobromic acid, will not produce high-grade heat-plastic materials, the rubber being obviously converted to these superior heat-plastic compositions by the cooperative action of both the phenol and the acid. Moreover, after the reaction in solution has taken place, it is possible to recover by distillation, as by steam distillation or other well known means, substantially all the rubber solvent and substantially all the phenol employed, while the yield of the heat-plastic material is substantially quantitative, that is, practically the same amount by weight of heat-plastic material is obtained as that of the original rubber employed. This would indicate that the phenol and the acidic agent act in conjunction one with the other in a catalytic capacity to facilitate the transformation of the rubber to its heat-plastic form, but the exact character of the reaction has not up to the present time been ascertained. A certain amount of residual acid is found in the final product which may be removed by washing, or its effects in the reaction product may be made innocuous by neutralization with an alkali. The purified product, the solvent, phenol and acidic reagent having been removed, is found to have the empirical formula $(C_5H_8)_x$ and a less unsaturation than the rubber from which it is produced. It is generically an isomer of rubber.

The following examples are herein given to illustrate the process hereinabove described:

*Example 1.*—In carrying out a preferred embodiment of the invention, 200 parts by weight of a 5% solution of rubber in benzene are placed in a suitable receptacle and arranged under reflux in order to return to the solution any of the solvent which may be distilled off during the process. To the rubber solution are added 40 parts by weight of phenol and 15 parts of concentrated hydrochloride acid, the acid preferably, although not necessarily, having been diluted with equal parts by weight of water in order to minimize the escape of hydrogen chloride vapors during the heating operation. The order of mixing the ingredients has been found to be immaterial. The receptacle containing the above mixture of ingredients is then placed on a steam bath maintained at substantially 100° C., the liquid in the receptacle thus being maintained at a boiling temperature. The heating is continued for approximately 40 hours and at the end of the heating period, the reaction mixture is subjected to steam distillation until substantially all the solvent and the phenol have been driven off. The resulting solid is washed on a hot rubber mill to remove the residue of acid. The product thus formed is found to be heat-plastic at relatively low temperatures and upon analysis to correspond to the formula $(C_5H_8)_x$ and to be approximately 50 percent as unsaturated as rubber. It is also soluble in the common rubber solvents, such as benzene, gasoline, turpentine, chloroform, carbon tetrachloride, carbon bisulfide, generally giving colloidal solutions of lower viscosity than rubber, and practically insoluble in alcohol, ether, acetone, glacial acetic acid, aniline, water, and dilute acids and alkalies. Its specific gravity is approximately 0.99.

*Example 2.*—As an illustration of a method suitable for commercial operation, place 300 parts by weight of rubber (pale crepe) in a benzol solution (90% benzol, 10% rubber) in a suitable receptacle, preferably under reflux and on a steam bath, and add thereto 600 parts of phenol and 450 parts of concentrated hydrochloric acid, admixing the ingredients thoroughly. The admixture is now subjected to normal steam-bath temperature for three days, at the end of which period the solvent and phenol is distilled off, either by steam distillation or by low temperature distillation methods. The resulting product is washed with water to remove residual acid and the yield after elimination of impurities is only slightly less than the weight of the original rubber content. The conversion products prepared in accordance with this process correspond in all substantial respects as to chemical and physical properties to the product hereinabove described in Example 1 and tests have shown the products to have the following properties: tensile strength, 4800 pounds per square inch; elongation at break, 2.5%; impact strength, 28 inch-pounds per square inch; transverse strength, 9200 pounds per square inch; compressive strength, 11,500 pounds per square inch; and softening temperature, 195° F. When formed into a cement and used as an adhesive between metal and a rubberized fabric, these conversion products are found to have approximately 10 to 15 times as strong adhesive properties as the best rubber cements.

*Example 3.*—As illustrative of procedure for preparing thermoplastic products from vulcanized rubber, take 5 parts by weight of vulcanized, ground inner tube scrap, 90 parts of a rubber solvent, such as tetrachlorethane, 10 parts of phenol and 3 parts of concentrated hydrochloric acid, and thoroughly admix these ingredients, as by stirring. Place the batch on a steam bath and heat for two days more or less, or until the conversion reaction is completed. The conversion product, when recovered from the liquid reaction mixture in the manner described in the preceding examples, is a fine thermoplastic product, readily resoluble in a rubber solvent, such as benzene, and has been found to form a satisfactory base for molded goods, and in solution for paints and adhesive cements.

*Example 4.*—Into 100 parts by weight of a 5 percent rubber solution in benzene are added 20 parts of phenol, 10 parts of concentrated hydrobromic acid (40 percent HBr), and 14 parts of water, the latter not being essential but being added in order to minimize the escape of hydrogen bromide vapors during the heating. The admixture is placed in a suitable receptacle under reflux and is heated on a steam bath for two days, more or less, or until the conversion reaction has been completed. The conversion product is recovered in the manner hereinabove described, and is found to correspond in its chemical and physical properties to the product of Example 1.

I have also found that balata, gutta percha, synthetic rubbers, such as the so-called methyl rubbers, and reclaimed rubbers which contain only minor proportions of fillers and pigments may be converted by the above described processes into plastic products having properties of the order hereinabove described with respect to the rubber conversion products. Reclaims and vulcanized scrap rubbers containing high percentages of pigments have been found not to be particularly satisfactory, principally because of the reaction between the pigments and the acid during the conversion reaction, and even where the pigments are inert they are found to retard the conversion of the rubber. The term "rubber" is employed in the appended claims in a generic sense to include crude and vulcanized rubbers, synthetic rubbers and rubber-like substances of the character herein referred to.

It will be understood that other rubber solvents than those mentioned in the above examples may be employed, carbon tetrachloride, gasoline and tetrachlorethane having been satisfactorily employed in the processes of this application. It is further to be understood that phenols other than phenol itself may be employed in this process, and although the latter has been found to be preferable, cresol, carvacrol, α-naphthol, β-naphthol, catechol and p-chloro-phenol have also been satisfactorily employed. The conversion products herein described are vulcanizable with sulfur, as by incorporating the sulfur into the conversion product and subsequently heating to vulcanizing temperatures.

Since the conversion products made in accordance with processes of this application are soluble in the inexpensive rubber solvents, solutions thereof have been found to be of value as bases for preparation of paints and for the preparation of adhesive cements. Where this use is to be made of the conversion products, I may take the intermediate liquid product obtained by heating the rubber solution with phenol and the acid and without removing the solvent or the phenol, or only partially removing the same, employ this intermediate liquid product directly for, or as a basis for, coating materials. It is generally desirable however to remove the acid because of its corrosive effects, particularly upon metals, and this may be accomplished by washing the intermediate liquid product with water one or more times to dissolve out the acid constituent, or the acid in the intermediate liquid product may be neutralized by adding thereto an alkali, as by running ammonia gas therethrough.

The conversion products of this application are also useful in the production of molded articles, since they are readily heat-plastic and are easily combined with the fillers, pigments, etc., commonly employed in the molding of shellac and synthetic resinous materials.

While in the procedure of Examples 1, 2 and 4 hereinabove, the rubber has been first dissolved in an organic solvent, I find that the reaction may equally well be effected by admixing the rubber, preferably in small pieces, with the solvent, the phenol and the acid reagent. Upon heating, the rubber goes into solution, the phenol assisting in the dissolution of the rubber. Where difficultly soluble rubbers are employed, as vulcanized rubber, reclaimed rubber, etc., this method of procedure, indicated in Example 3, has been found to be highly advantageous.

It will be obvious that various modifications in the proportions of the ingredients specified in the above examples and in the time and temperature of carrying out the conversion reaction may be employed without departing from the principles of this invention and I therefore do not desire wholly to limit the appended claims except as may be necessitated by the prior art.

I claim:

1. The method of producing conversion products of rubber which comprises forming a liquid admixture of vulcanized rubber, a rubber solvent, a phenol and a substance selected from a class consisting of hydrochloric acid and hydrobromic acid, and heating the admixture.

2. The method of producing conversion products of rubber, which comprises forming an admixture of rubber in solution, a phenol and a substance selected from a class consisting of hydrochloric acid and hydrochromic acid, heating the admixture at approximately the boiling temperature of the solvent to convert the rubber to a solid, heat-plastic product, and thereafter distilling off the rubber solvent and the phenol.

3. The method set forth in claim 2 in which the product after distillation is rendered non-acid in character.

4. The method as set forth in claim 2 in which the product is rendered non-acid in character by neutralization of its acid content.

5. A composition of matter which comprises a liquid mixture of a rubber solvent, a phenol, and a heat-plastic rubber conversion product.

6. A composition of matter which comprises a non-acid liquid mixture of a rubber solvent, a phenol and a rubber isomer.

7. A composition of matter which comprises a non-acid admixture of a rubber solvent, a phenol, and a heat-plastic material produced from rubber.

8. A composition of matter comprising the product of the reaction, under the influence of heat and in the presence of phenol, of rubber in solution and a substance selected from a group consisting of hydrochloric acid and hydrobromic acid.

9. A composition of matter comprising the product of the reaction, under the influence of heat and in the presence of phenol, of vulcanized rubber in solution and hydrochloric acid.

In witness whereof I have hereunto set my hand this 20th day of November, 1926.

HARRY L. FISHER.